(12) United States Patent
Liao et al.

(10) Patent No.: US 7,770,805 B2
(45) Date of Patent: Aug. 10, 2010

(54) METHOD FOR CODING TWO DIMENSIONAL OPTICAL IDENTIFICATION WITH THE SAME GRAY LEVEL AND PRINTING PRODUCT THEREOF

(75) Inventors: Tung-Tsai Liao, Hsin Chu (TW); Shih-Chien Lin, Miao Li (TW); Yu-Tang Chang, Hsin Chu County (TW)

(73) Assignee: Generalplus Technology Inc., Hsinchu (TW)

( * ) Notice: Subject to any disclaimer, the term of this patent is extended or adjusted under 35 U.S.C. 154(b) by 46 days.

(21) Appl. No.: 12/346,403

(22) Filed: Dec. 30, 2008

(65) Prior Publication Data
US 2010/0006657 A1   Jan. 14, 2010

(30) Foreign Application Priority Data
Jul. 11, 2008   (TW) .............................. 97126227 A

(51) Int. Cl.
*G06K 19/06* (2006.01)
(52) U.S. Cl. .................. 235/494; 235/487; 235/454
(58) Field of Classification Search ................ 235/494, 235/454, 487
See application file for complete search history.

(56) References Cited

U.S. PATENT DOCUMENTS

| | | | | |
|---|---|---|---|---|
| 5,897,669 A | * | 4/1999 | Matsui | 235/462.07 |
| 5,984,189 A | * | 11/1999 | Tomioka | 235/487 |
| 6,186,405 B1 | * | 2/2001 | Yoshioka | 235/494 |
| 7,387,261 B2 | * | 6/2008 | Onishi | 235/494 |
| 7,549,597 B2 | * | 6/2009 | Tsai et al. | 235/494 |
| 2006/0022061 A1 | * | 2/2006 | MacKenzie | 235/494 |
| 2006/0196950 A1 | * | 9/2006 | Kiliccote | 235/494 |

* cited by examiner

*Primary Examiner*—Michael G Lee
*Assistant Examiner*—Keith Goodman, Jr.
(74) *Attorney, Agent, or Firm*—Muncy, Geissler, Olds & Lowe, PLLC

(57) ABSTRACT

The invention relates to a method for coding a two dimensional (2D) optical identification (OID) with the same gray level and a printing product thereof. The printing product includes a 2D-OID, which includes a positioning block and a plurality of data coding blocks. The positioning block has a plurality of specific patterns arranged as an N×M matrix, wherein the specific patterns along a first edge thereof and the specific patterns along a second edge thereof are filled. The data coding blocks are disposed around the positioning block and include the specific patterns arranged as the N×M matrix, wherein the specific pattern in a center of the data coding blocks is filled. A specific number of the remaining specific patterns in each data coding block are filled to serve as a code for representation of data.

19 Claims, 6 Drawing Sheets

METHOD FOR CODING TWO DIMENSIONAL OPTICAL IDENTIFICATION WITH THE SAME GRAY LEVEL AND PRINTING PRODUCT THEREOF

This application claims priority of No. 097126227 filed in Taiwan R.O.C. on Jul. 11, 2008 under 35 USC 119, the entire content of which is hereby incorporated by reference.

BACKGROUND OF THE INVENTION

1. Field of Invention

The invention relates to the technology for an optical identification, and more particularly to a two dimensional optical identification (2D-OID) with the same gray level in a visual aspect, and a printing product using the same.

2. Related Art

With the progress of the technology, the message identifier (ID) technique is getting more and more progressed. The message identifier mainly employs a computer to automatically acquire features or build-in data of objects according to differences between the objects, and converts the acquired features or data into the digital information that can be stored in the computer system. Then, the objectives of identification and management can be achieved according to the comparison and the data management of the computer system. The message identifier technique includes a barcode, a magstripe, optical character recognition (OCR), biometric recognition, a smart card and radio frequency identification (RFID). The applications thereof are very wide and include checkout, credit cards, fingerprint recognition, telephone IC cards and easy cards for metro.

An optical identification (OID) can hide the digital data and acquire the hidden digital data in the typical printing product, and can hide the digital data in the typical printing product through the standard printing program and the standard ink. The data previously hidden in the printing product can be taken out through the optical and image processing techniques of an optical recognition pen (OID Pen). In the prior art, each OID coded graph is composed of many fine dots each corresponding to one set of specific values. The OID has the high privacy.

However, the most difficult portion in the coding technique is that the coded graph needs to have the dots that are uniformly distributed so that the visual interference can be effectively reduced and the glory of the printing product cannot be influenced.

SUMMARY OF THE INVENTION

It is therefore an objective of the invention to provide a two dimensional optical identification (2D-OID) coding method for making coded message identifiers be uniformly distributed and reaching the visual effect of the constant gray level.

Another objective of the invention is to provide a printing product, in which specific information is hidden.

To achieve the above-identified or other objectives, a method for coding a two dimensional optical identification (2D-OID) is provided. The method includes the steps of: providing a positioning block; providing a plurality of data coding blocks; disposing the data coding blocks around the positioning block; providing a plurality of specific patterns in the positioning block, wherein the specific patterns are arranged as an N×M matrix; providing the specific patterns in the data coding blocks, wherein the specific patterns are respectively arranged as the N×M matrixes in the data coding blocks, respectively; filling the specific patterns adjacent to a first edge of the positioning block, and filling the specific patterns adjacent to a second edge of the positioning block; filling at least one of the specific patterns in a center of the data coding blocks; and taking out a specific number of the specific patterns from the remaining specific patterns in each of the data coding blocks according to to-be-stored data, and filling the specific number of the specific patterns, which are taken out, wherein N and M are natural numbers.

The invention also provides a printing product including a two dimensional optical identification (2D-OID). The 2D-OID includes a positioning block and a plurality of data coding blocks. The positioning block has a plurality of specific patterns arranged as an N×M matrix. The specific patterns adjacent to a first edge of the positioning block and the specific patterns adjacent to a second edge of the positioning block are filled. The data coding blocks are disposed around the positioning block and have the same specific patterns. The specific patterns are respectively arranged as N×M matrixes in the data coding blocks. At least one of the specific patterns positioned in a center of the data coding blocks is filled. In each of the data coding blocks, a specific number of the specific patterns in the remaining specific patterns are filled to serve as a code for representation of data. In this case, N and M are natural numbers.

In the method for coding the two dimensional optical identification (2D-OID) with the same gray level and the printing product thereof according to the preferred embodiments of the invention, each of the remaining specific patterns in each of the data coding blocks represents a binary code. In a specific embodiment, N is equal to M and equal to 3, and in the data coding blocks, the 8 remaining specific patterns except for the specific pattern, which is filled, in the center respectively represent three-bit binary codes, which are respectively 000, 001, 010, 011, 100, 101, 110 and 111. Similarly, when N is equal to M and equal to 3, the total number of the specific patterns, which are filled and adjacent to the first edge and the second edge, is equal to 5, and the 4 remaining specific patterns respectively represent two-bit binary codes, which are respectively 00, 01, 10 and 11.

In the method for coding the two dimensional optical identification (2D-OID) with the same gray level and the printing product thereof according to the preferred embodiments of the invention, when N is equal to M and equal to 5, the 24 remaining specific patterns except for the specific pattern, which is filled, in the center and in the data coding blocks are respectively divided into six sub-blocks for respectively representing two-bit binary codes, which are respectively 00, 01, 10 and 11. In another embodiment, when N is equal to 5, the 24 remaining specific patterns except for the specific pattern, which is filled, in the center and in the data coding blocks are respectively divided into three sub-blocks for respectively representing three-bit binary codes, which are respectively 000, 001, 010, 011, 100, 101, 110 and 111. When N is equal to M and equal to 5, the total number of the specific patterns, which are filled and adjacent to the first edge and the second edge, is equal to 9 in the positioning block, and the 16 remaining specific patterns respectively represent three-bit binary codes, which are respectively 000, 001, 010, 011, 100, 101, 110 and 111.

In the method for coding the two dimensional optical identification (2D-OID) with the same gray level and the printing product thereof according to the preferred embodiments of the invention, each of the specific patterns is a circle. In a specific embodiment, the number of the data coding blocks is equal to 8, and the data coding blocks and the positioning block constitute a 3×3 magic square. In addition, in another specific embodiment, each of the remaining specific patterns in each of the data coding blocks represents a binary code.

The spirit of the invention is to provide a positioning block and data coding blocks disposed around the positioning block, and to provide an N×M matrix in each of the blocks. Because the specific patterns adjacent to two neighboring edges of the positioning block are filled, the optical recognition device can ensure the reading direction. In the data coding block, only the specific number of specific patterns other than the specific pattern in the center are filled. So, when the code of the invention is applied to the printing product, the visual effect with the same gray level may be achieved as long as the code of the invention is sufficiently small. That is, the invention can code the to-be-hidden information on the printing product.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
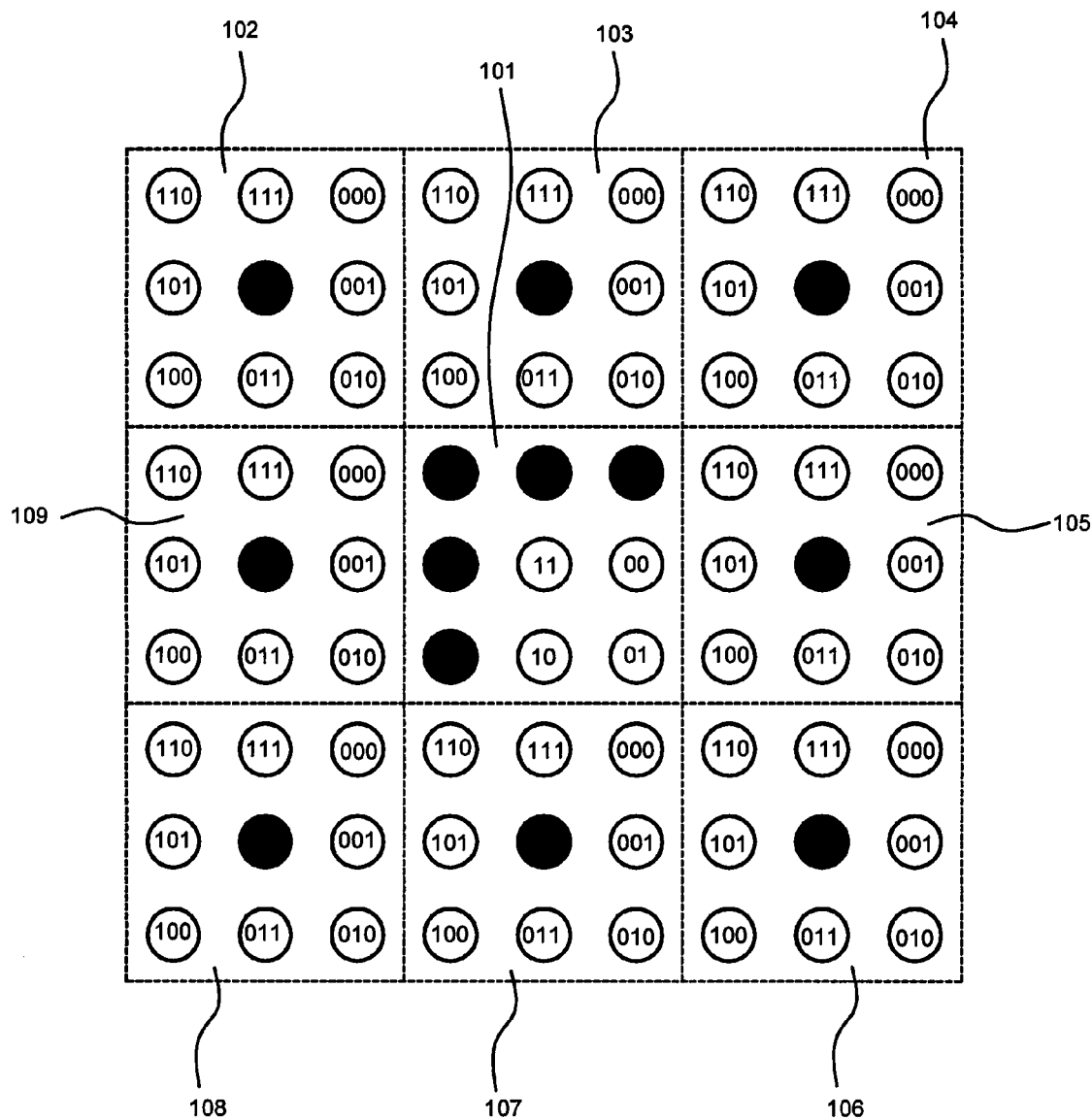
FIG. 1 is a coding diagram showing a 2D-OID according to an embodiment of the invention.

FIG. 1 is a coding diagram showing a two dimensional optical identification (2D-OID) according to an embodiment of the invention. Referring to FIG. 1, the 2D-OID includes a positioning block 101 and eight data coding blocks 102 to 109. The data coding blocks 102 to 109 and the positioning block 101 constitute a 3×3 magic square. The positioning block 101 is mainly designed such that a 2D-OID optical reading device can recognize the reading direction. Therefore, the dots on the left edge and the top edge of the positioning block 101 are filled. In addition, the dot in the center of the data coding blocks 102 to 109 is filled. As shown in the drawing, each hollow dot represents a binary digit. For example, the remaining eight hollow dots of the data coding blocks 102 to 109 respectively represent 000, 001, 010, 011, 100, 101, 110 and 111. Thus, each of the data coding blocks 102 to 109 may be employed to code the 3-bit data. The remaining four hollow dots of the positioning block 101 respectively represent 00, 01, 10 and 11. Thus, the positioning block 101 may be employed to code the 2-bit data.

When the data is to be coded into the coding diagram, at most one dot of each of the data coding blocks 102 to 109 is filled in this embodiment because each hollow dot represents a digit. In addition, only one dot of the positioning block 101 is filled. Generally speaking, the code is getting smaller and smaller with the progress of the optical reading technique. As for the current technique, the resolution of 800 DPI (dots per inch) may be reached. Thus, 88 sets of codes may be placed in one square inch in this embodiment. Furthermore, each coding unit has nine blocks 101 to 109 in this embodiment, and the number of dots in each coding unit is constant and equal to 22 (2×8+5+1=22). Thus, when the code is very small, such as the resolution of 800 DPI, the human eyes may almost feel that the gray levels are the same. Thus, this code can reach the effect of the constant gray level. Because this code has the property of the constant gray level, this code cannot easily cause the visual interference. That is, when this code is used on the printing product, the information can be hidden therein and cannot be found. Thus, this code has the relative high privacy.

It is to be noted that one possible aspect of the 2D-OID method according to the embodiment of the invention has been illustrated. However, one of ordinary skill in the art may easily understand that the size of the coding unit, the size of the data coding block, the size of the positioning block, the position of the representing bit, and the filled color may be modified by various manufacturers. Thus, the application of the invention is not restricted to the possible aspect. In other words, the spirit of the invention is satisfied as long as a specific number of specific patterns are taken from the remaining specific patterns of each of the data coding blocks according to the to-be-stored data, and the specific number of specific patterns are filled. That is, the property of the constant gray level can be obtained.

Next, a 2D-OID embodiment will be illustrated to make one of ordinary skill in the art implement the invention according to the spirit of the invention.

Figure 2:
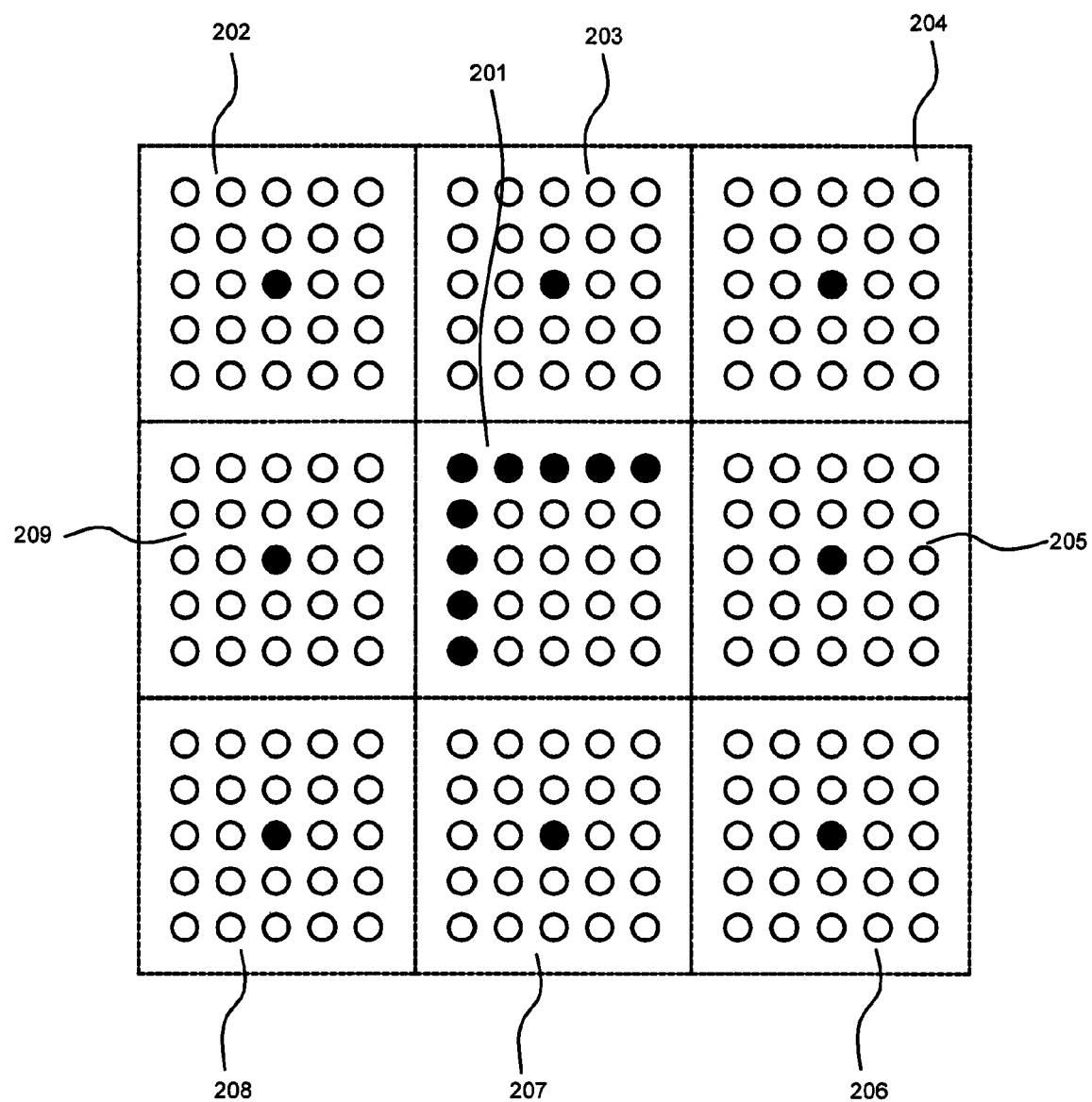
FIG. 2 is a coding diagram showing the 2D-OID according to another embodiment of the invention.

FIG. 2 is a coding diagram showing the 2D-OID according to another embodiment of the invention. Referring to FIG. 2, the 2D-OID of this embodiment also includes a positioning block 201 and eight data coding blocks 202 to 209. The data coding blocks 202 to 209 and the positioning block 201 constitute a 3×3 magic square. The positioning block 201 is designed to make the 2D-OID optical reading device recognize the reading direction. Thus, the dots on the left edge and the top edge of this positioning block 201 are filled. However, one of ordinary skill in the art may also modify the design such that the dots on the right and top edges, the right and bottom edges or the left and bottom edges are filled according to different requirements. In addition, the number of filled dots is not restricted to nine, and detailed descriptions thereof will be omitted. In addition, the dot in the center of the data coding blocks 202 to 209 is filled. Similarly, one of ordinary skill in the art may also modify the design such that the filled dot is not restricted to one dot in the center. For example, nine dots in the center may be filled. So, the invention is not limited thereto.

Figure 3:
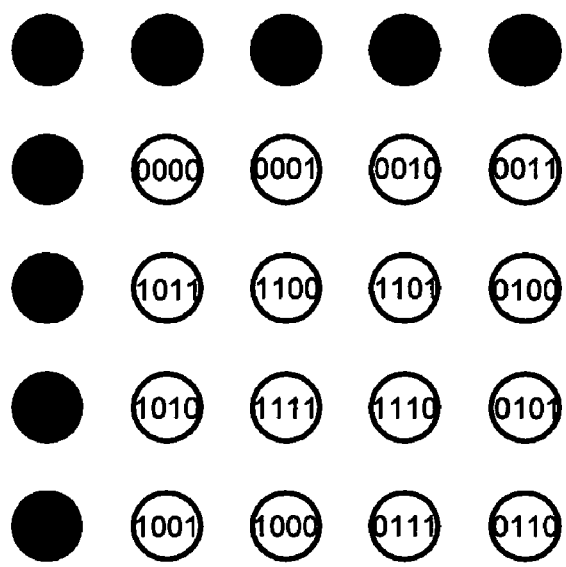
FIG. 3 is a coding diagram showing a positioning block 201 of the 2D-OID of FIG. 2 according to the embodiment of the invention.
Figure 4:
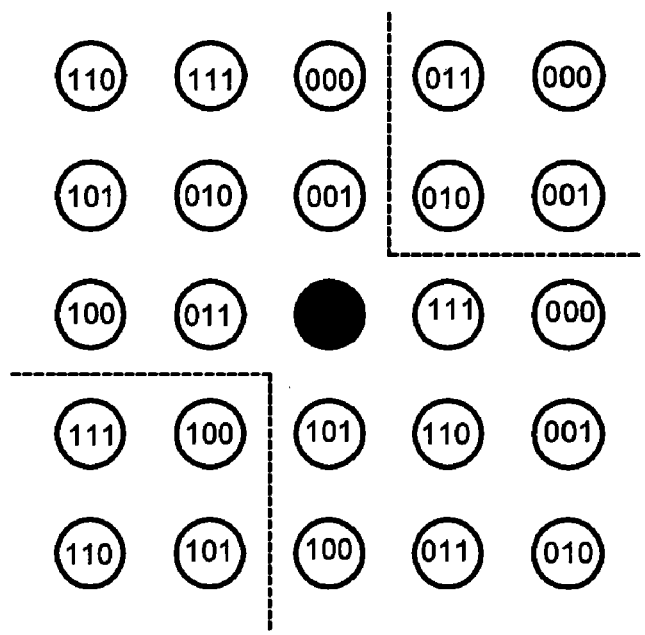
FIG. 4 is a coding diagram showing data coding blocks 202 to 209 of the 2D-OID of FIG. 2 according to the embodiment of the invention.

FIG. 3 is a coding diagram showing the positioning block 201 of the 2D-OID of FIG. 2 according to the embodiment of the invention. As shown in FIG. 3, nine dots in the positioning block 201 are filled, so 16 dots are remained and can respectively represent 4 bits, which are respectively 0000, 0001, 0010, 0011, 1000, 1001, 1010, 1011, 1100, 1101, 1110 and 1111. FIG. 4 is a coding diagram showing the data coding blocks 202 to 209 of the 2D-OID of FIG. 2 according to the embodiment of the invention. As shown in FIG. 4, the number of remaining dots is equal to 24 in this embodiment, and can be thus divided into three blocks. The first block is composed of eight dots at the left-top corner, the second block is composed of eight dots at the right-bottom corner, and the third block is composed of four dots at the right-top corner and four dots at the left-bottom corner. Each block represents 3 bits, which are respectively 000, 001, 010, 011, 100, 101, 110 and 111. In this embodiment, each of the data coding blocks 202 to 209 is additionally filled with three dots. Thus, four dots are filled in each of the data coding blocks 202 to 209. Consequently, each of the data coding blocks 202 to 209 may represent 9 bits.

Figure 5:
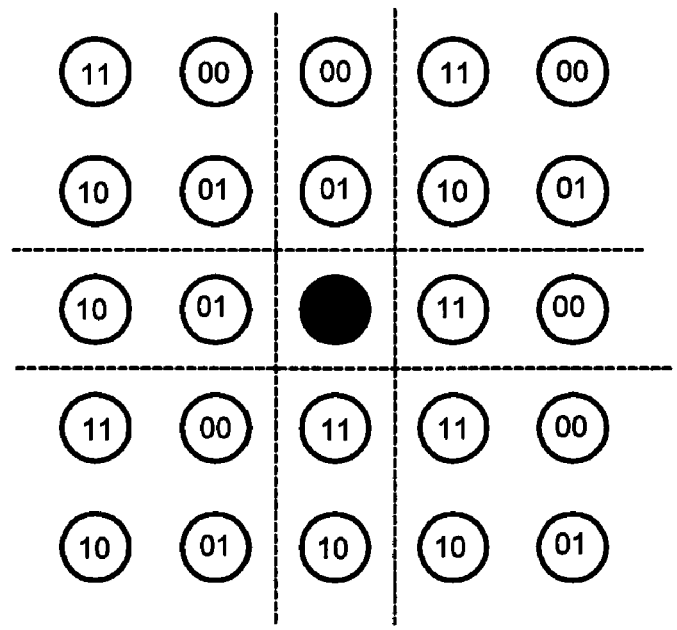
FIG. 5 is a coding diagram showing the data coding blocks 202 to 209 of the 2D-OID of FIG. 2 according to the embodiment of the invention.

FIG. 5 is a coding diagram showing the data coding blocks 202 to 209 of the 2D-OID of FIG. 2 according to the embodiment of the invention. As shown in FIG. 5, the number of remaining dots in the data coding blocks 202 to 209 in this embodiment is also equal to 24, but the remaining dots are divided into six blocks. The first block is composed of four dots at the left-top corner; the second block is composed of four dots at the left-bottom corner; the third block is composed of four dots at the right-top corner; the fourth block is composed of four dots at the right-bottom corner; the fifth block is composed of four dots on the middle vertical straight line; and the sixth block is composed of four dots on the middle horizontal straight line. Each block represents 2 bits, which are 00, 01, 10 and 11. In this embodiment, each of the data coding blocks 202 to 209 is additionally filled with six dots, so seven dots are filled in each of the data coding blocks 202 to 209. Thus, each of the data coding blocks 202 to 209 may represent 12 bits.

Figure 6:
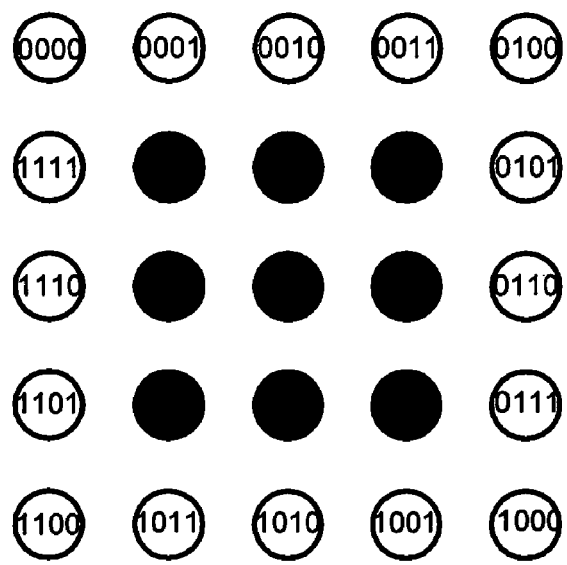
FIG. 6 is a coding diagram showing the data coding blocks 202 to 209 of the 2D-OID of FIG. 2 according to the embodiment of the invention.

FIG. 6 is a coding diagram showing the data coding blocks 202 to 209 of the 2D-OID of FIG. 2 according to the embodiment of the invention. As shown in FIG. 6, nine dots in the center are filled in this embodiment. So, the number of remaining dots in the data coding blocks 202 to 209 is equal to 16. Thus, the remaining dots in this embodiment may respectively represent 4 bits, which are respectively 0000, 0001, 0010, 0011, 1000, 1001, 1010, 1011, 1100, 1101, 1110 and 1111. In this embodiment, ten dots are filled in each of the data coding blocks 202 to 209. Thus, each of the data coding blocks 202 to 209 may represent 4 bits and is the same as the positioning block.

Although the 5×5 matrix composed of the data coding blocks and the positioning block is illustrated in the embodiment, one of ordinary skill in the art should know that the 4×4 or 6×6 matrix or even the N×M matrix may also reach the effect of the invention according to the embodiments mentioned hereinabove. So, the invention is not limited to the disclosed embodiments. In addition, although the hollow circular dot and the solid circular dot are illustrated in the above-mentioned embodiments, one of ordinary skill in the art may easily understand that the hollow circular dot and the solid circular dot may be exchanged to implement the invention. In addition, the circle may be modified into other shapes, such as a rectangular shape or a hexagonal shape, and the effect of the invention may be achieved. Thus, the application of the invention is not restricted thereto.

Figure 7:
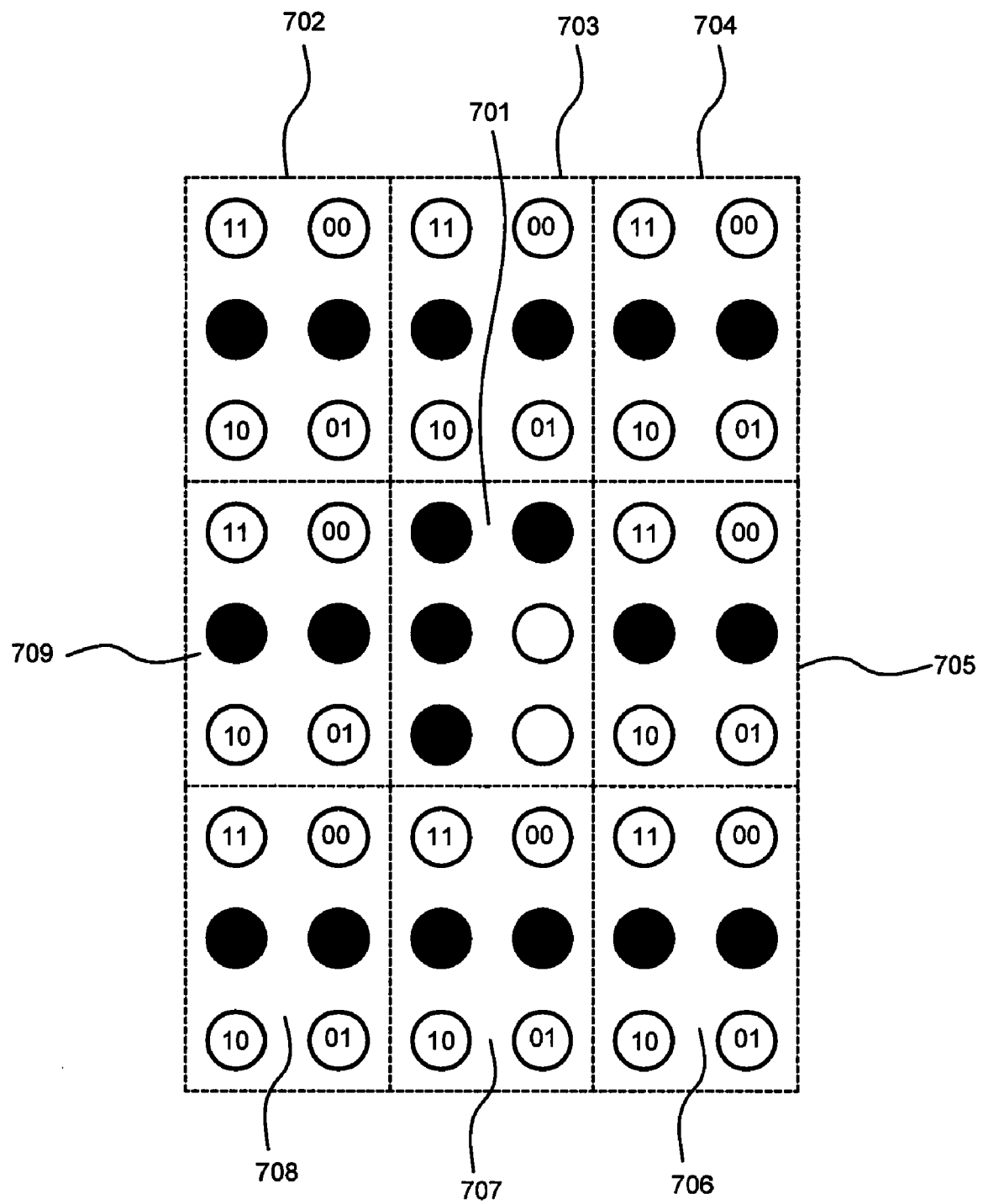
FIG. 7 is a coding diagram showing a 2×3 2D-OID according to the embodiment of the invention.

In order to make one of ordinary skill in the art implement the N×M coding method, another embodiment will be illustrated. FIG. 7 is a coding diagram showing a 2×3 2D-OID according to the embodiment of the invention. Referring to FIG. 7, each of a positioning block 701 and data coding blocks 702 to 709 has six dots arranged as a 3×2 matrix. The remaining dots in the positioning block 701 are not used. Two dots at the middle of each of the data coding blocks 702 to 709 are filled, and the remaining four dots respectively represent 2 bits, which are respectively 00, 01, 10 and 11. Thus, this set of codes can be coded with 16 bits.

One of ordinary skill in the art may easily understand that the 2D-OID encoding still can be performed based on the spirit of the invention and the effect of the constant gray level can be achieved even if the matrix is not a square. So, the invention is not limited to the square coding.

Figure 8:
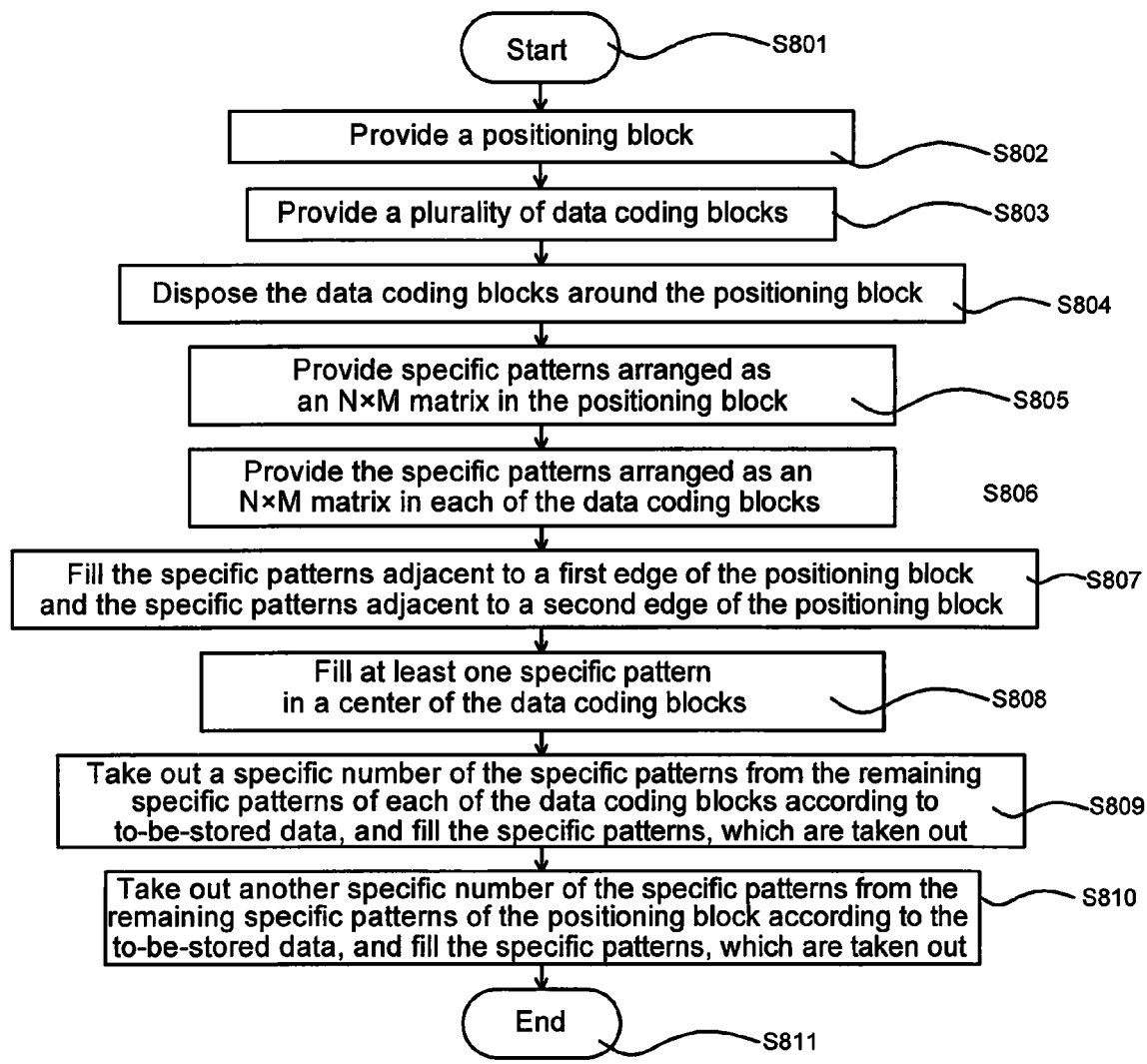
FIG. 8 is a flow chart showing a coding method of the 2D-OID according to the embodiment of the invention.

According to the embodiments, a coding method of the 2D-OID may be concluded. FIG. 8 is a flow chart showing a coding method of the 2D-OID according to the embodiment of the invention. Referring to FIG. 8, the method includes the following steps.

In step S801, the method starts.

In step S802, a positioning block is provided.

In step S803, a plurality of data coding blocks is provided.

In step S804, the data coding blocks are disposed around the positioning block. For example, the blocks are arranged as a 3×3 magic square, as shown in FIGS. 1 and 2.

In step S805, a plurality of specific patterns is provided in the positioning block, wherein the specific patterns are arranged as an N×M matrix, and N and M are natural numbers, as shown by the circular dots in the embodiments of FIGS. 1 and 2.

In step S806, the specific patterns are provided in the data coding blocks, wherein the specific patterns are respectively arranged as the N×M matrixes in the data coding blocks.

In step S807, the specific patterns adjacent to a first edge of the positioning block and the specific patterns adjacent to a second edge of the positioning block are filled.

In step S808, at least one specific pattern positioned in a center of the data coding blocks is filled.

In step S809, a specific number of specific patterns are taken from the remaining specific patterns of each of the data coding blocks according to to-be-stored data, and the taken specific patterns are filled. For example, one dot is taken from the data coding block of FIG. 1 to represent the 3-bit digit; and three dots are taken from the data coding block of FIG. 2 to represent the 9-bit digit, or six dots for representing a 12-bit digit.

In step S810, another specific number of specific patterns are taken from the remaining specific patterns of the positioning block according to the to-be-stored data, and the taken specific patterns are filled.

In step S811, the method ends.

In the embodiment, the step S811 is an unessential step. One of ordinary skill in the art should understand that the main function of the positioning block is designed to make the optical reading device recognize the reading direction. Thus, whether the positioning block is employed to code the data or not is a design choice. So, the coding method of the 2D-OID of the invention is not limited thereto.

In summary, the spirit of the invention is to provide a positioning block and data coding blocks disposed around the positioning block, and to provide an N×M matrix in each of the blocks. Because the specific patterns adjacent to two neighboring edges of the positioning block are filled, the optical recognition device can ensure the reading direction. In the data coding block, only the specific number of specific patterns other than the specific pattern in the center are filled. So, when the code of the invention is applied to the printing product, the visual effect with the same gray level may be achieved as long as the code of the invention is sufficiently small. That is, the invention can code the to-be-hidden information on the printing product.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method for coding a two dimensional optical identification (2D-OID), the method comprising the steps of:
   providing a positioning block;
   providing a plurality of data coding blocks;
   disposing the data coding blocks around the positioning block;
   providing a plurality of specific patterns in the positioning block, wherein the specific patterns are arranged as an N×M matrix;
   providing the specific patterns in the data coding blocks, wherein the specific patterns are respectively arranged as the N×M matrixes in the data coding blocks, respectively;
   filling the specific patterns adjacent to a first edge of the positioning block, and filling the specific patterns adjacent to a second edge of the positioning block;
   filling at least one of the specific patterns in a center of the data coding blocks; and
   taking out and filling a specific number of the specific patterns from the remaining specific patterns in each of the data coding blocks according to to-be-stored data, and filling the specific number of the specific patterns, which are taken out, wherein N and M are natural numbers.

2. The method according to claim 1, wherein each of the remaining specific patterns in each of the data coding blocks represents a binary code.

3. The method according to claim 1, wherein N is equal to M and equal to 3, and in the data coding blocks, the 8 remaining specific patterns except for the specific pattern, which is filled, in the center respectively represent three-bit binary codes, which are respectively 000, 001, 010, 011, 100, 101, 110 and 111.

4. The method according to claim 1, wherein N is equal to M and equal to 3, and in the positioning block, the total number of the specific patterns, which are filled and adjacent to the first edge and the second edge, is equal to 5, and the four remaining specific patterns respectively represent two-bit binary codes, which are respectively 00, 01, 10 and 11.

5. The method according to claim 1, wherein N is equal to M and equal to 5, and in the data coding blocks, the 24 remaining specific patterns except for the specific pattern, which is filled, in the center are respectively divided into six sub-blocks for respectively representing two-bit binary codes, which are respectively 00, 01, 10 and 11.

6. The method according to claim 1, wherein N is equal to M and equal to 5, and in the data coding blocks, the 24 remaining specific patterns except for the specific pattern, which is filled, in the center are respectively divided into three sub-blocks for respectively representing three-bit binary codes, which are respectively 000, 001, 010, 011, 100, 101, 110 and 111.

7. The method according to claim 1, wherein N is equal to M and equal to 5, and in the positioning block, the total number of the specific patterns, which are filled and adjacent to the first edge and the second edge, is equal to 9, and the 16 remaining specific patterns respectively represent three-bit binary codes, which are respectively 000, 001, 010, 011, 100, 101, 110 and 111.

8. The method according to claim 1, wherein each of the specific patterns is a circle.

9. The method according to claim 1, wherein the number of the data coding blocks is equal to 8, and the data coding blocks and the positioning block constitute a 3×3 magic square.

10. The method according to claim 1, wherein the number of the data coding blocks is equal to 8, and the data coding blocks and the positioning block constitute a 3×3 magic square.

11. A printing product, comprising:
    a two dimensional optical identification (2D-OID), which comprises:
    a positioning block having a plurality of specific patterns, wherein the specific patterns are arranged as an N×M matrix, and the specific patterns adjacent to a first edge of the positioning block and the specific patterns adjacent to a second edge of the positioning block are filled; and
    a plurality of data coding blocks disposed around the positioning block and having the specific patterns, wherein the specific patterns are respectively arranged as N×M matrixes in the data coding blocks, and at least one of the specific patterns positioned in a center of the data coding blocks is filled, wherein:
    in each of the data coding blocks, a specific number of the specific patterns in the remaining specific patterns are filled to serve as a code for representation of data; and
    N and M are natural numbers.

12. The printing product according to claim 11, wherein each of the remaining specific patterns in each of the data coding blocks represents a binary code.

13. The printing product according to claim 11, wherein N is equal to M and equal to 3, and in the data coding blocks, the 8 remaining specific patterns except for the specific pattern, which is filled, in the center respectively represent three-bit binary codes, which are respectively 000, 001, 010, 011, 100, 101, 110 and 111.

14. The printing product according to claim 11, wherein N is equal to M and equal to 3, and in the positioning block, the total number of the specific patterns, which are filled and adjacent to the first edge and the second edge, is equal to 5, and the four remaining specific patterns respectively represent two-bit binary codes, which are respectively 00, 01, 10 and 11.

15. The printing product according to claim 11, wherein N is equal to M and equal to 5, and in the data coding blocks, the 24 remaining specific patterns except for the specific pattern, which is filled, in the center are respectively divided into six sub-blocks for respectively representing two-bit binary codes, which are respectively 00, 01, 10 and 11.

16. The printing product according to claim 11, wherein N is equal to M and equal to 5, and in the data coding blocks, the 24 remaining specific patterns except for the specific pattern, which is filled, in the center are respectively divided into three sub-blocks for respectively representing three-bit binary codes, which are respectively 000, 001, 010, 011, 100, 101, 110 and 111.

17. The printing product according to claim 11, wherein in the positioning block, the total number of the specific patterns, which are filled and adjacent to the first edge and the second edge, is equal to 9, and the 16 remaining specific patterns respectively represent three-bit binary codes, which are respectively 000, 001, 010, 011, 100, 101, 110 and 111.

18. The printing product according to claim 11, wherein each of the specific patterns is a circle.

19. The printing product according to claim 11, wherein the number of the data coding blocks is equal to 8, and the data coding blocks and the positioning block constitute a 3×3 magic square.

* * * * *